Patented Mar. 19, 1946

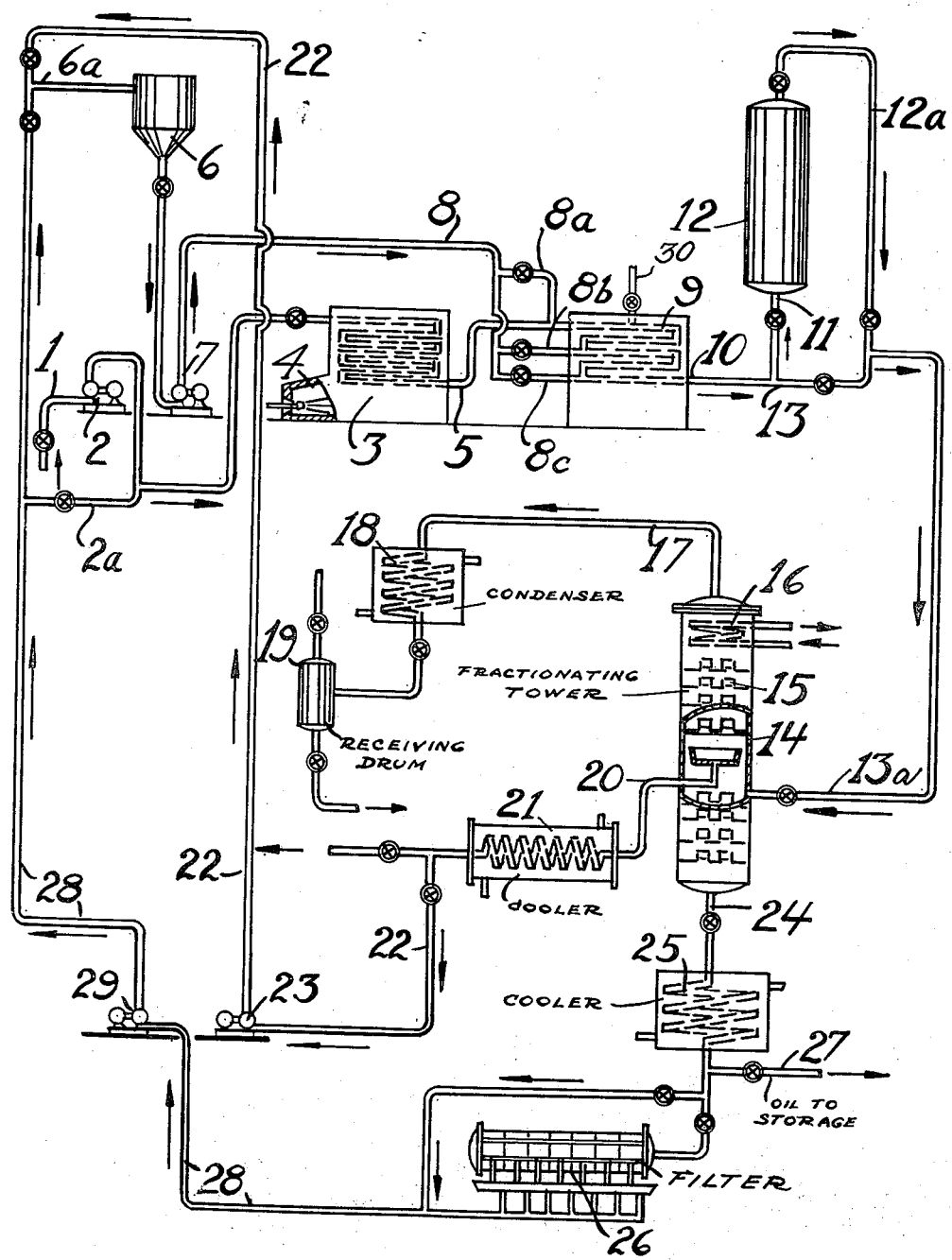

2,396,758

UNITED STATES PATENT OFFICE 2,396,758

CATALYTIC CONVERSION OF HYDROCARBON OILS

Reginald K. Stratford, Corunna, Ontario, Canada, assignor to Standard Oil Development Company, a corporation of Delaware Application February 18, 1941, Serial No. 379,415

8 Claims. (Cl. 196—52)

This invention relates to the catalytic conversion of hydrocarbon oils and pertains more particularly to a process for cracking oils in the presence of a catalyst powder and to the catalyst therefor.

It has heretofore been proposed to crack oils in the presence of a catalyst into lower boiling hydrocarbons suitable for motor fuels by injecting the catalyst in the form of a slurry of catalyst in oil or catalyst in water into a stream of oil vapors to be cracked and subjecting the resulting suspension or mixture to catalytic cracking in the vapor phase under elevated pressure. For example, a process of this general type is described in a copending application Serial No. 248,164, now U. S. Patent No. 2,319,710, dated May 19, 1943, filed jointly by myself and Roy H. Smith. According to the general type of process there outlined, the oil to be cracked is first vaporized and the oil-catalyst or water-catalyst slurry is injected into the oil vapors before passing through the cracking zone. The temperature of the oil vapors at the point of injection is sufficient to vaporize the oil or water from the slurry as the case may be. Vaporization may be assisted by adding a low-boiling fraction, such as hydrocarbon gases, gasoline or kerosene, to the feed.

The object of the present invention is to provide an improved catalyst for carrying out the type of process above outlined.

Other more specific objects and advantages of the invention will be apparent from the detailed description hereinafter in which reference will be made to the accompanying drawing which is a diagrammatic illustration of an apparatus capable of carrying the invention into effect.

The present invention is directed to the use of a hydrous oxide or mixture of hydrous oxides, or a mixture consisting of a hydrous oxide and a dry oxide, for making up the slurry injected into the stream of oil vapors to be cracked. The term "hydrous oxide" as herein employed is intended to mean a metallic oxide containing a substantial amount of water imbibed therein, such as a hydrosol, hydrogel, or gelatinous precipitate of the various oxides. For example, a hydrosol of silica can be prepared by neutralizing a sodium silicate solution under carefully controlled conditions such as is disclosed in the Patrick Patent No. 1,297,724. By properly regulating the concentration of the acid solution and sodium silicate solution and by constant agitation, a clear hydrosol of silica may be formed which upon standing will set into a hydrogel containing all of the water of solution imbibed therein. Such a product, for example, may contain upwards of 90% water and seldom contains less than 80%.

Under less carefully controlled conditions, a portion of the silica formed in the hydrosol may be precipitated immediately in the form of a flocculent gelatinous precipitate which may be also employed in carrying out the present invention.

The catalyst employed in carrying out the process heretofore outlined preferably consists of silica hydrosol, hydrogel, gelatinous precipitate or mixtures thereof to which are added other catalytic agents, such as, for example, alumina, magnesia, boria, zirconia, and the like. These metallic oxides may be added to the silica hydrosol, hydrogel, gelatinous precipitate or the like in a hydrous or non-hydrous form, such as in the form of a hydrosol, hydrogel, dry gel, or the commercial grades of oxides which may or may not have adsorptive characteristics. For example, an effective catalyst for carrying out the present process may consist of a plural hydrosol of silica and alumina. Such a hydrosol may be formed, for example, by combining an aluminum chloride, aluminum nitrate, aluminum sulfate, or other aluminum salt solutions with a solution of sodium silicate so that the sodium silicate is partially or completely hydrolyzed by the aluminum salt. If necessary, additional acid may be added to complete the hydrolysis and form a clear solution containing both the silica and alumina therein. This product may be injected directly into the oil stream or it may first be allowed to set into a hydrogel which may then be injected into the oil stream to be cracked.

As a further example, a hydrosol of silica may first be formed and an alumina hydrosol then added thereto to form a combined solution of silica and alumina hydrosols. The resulting mixture may be employed directly or may be allowed to set into a mixed hydrogel which is then injected into the oil stream.

As a further alternative, the alumina or other metallic oxide may be added in a relatively dry form, such as in the form of alumina gel, bauxite, or the like, to the silica hydrosol, or it may be mechanically mixed with the silica hydrogel after forming.

The important point in connection with the present invention is the use in the catalytic cracking process of a hydrosol, hydrogel, gelatinous precipitate, or other hydrous oxide directly in the catalytic cracking process without the intermediate conversion of the hydrogel or other product into a dry gel.

Other types of metallic oxides in addition to alumina or in lieu thereof may be incorporated into the hydrous oxide of silica and the resulting mixture in the form of a slurry injected directly into the oil stream to be cracked.

Referring to the drawing, numeral 1 denotes a feed line through which the oil is forced under high pressure by means of a pump 2. The oil passes through a heated coil 3 mounted in a furnace setting 4 and is discharged from the pipe 5 in a completely vaporized condition. At this point after complete vaporization, a catalytic agent is introduced, preferably as a slurry in a suitable carrying liquid, from a vessel 6 by means of a pump 7 and a pipe 8. Conditions are adjusted at this point, as will be disclosed below, so that the catalytic agent which is in a finely-divided form is immediately dispersed through the vaporized oil and passes into a cracking zone along with the oil vapor. The catalyst dispersion may be added in small amounts and at different points if desired, as at 8$^a$, b$^b$, and 8$^c$. The heating zone is shown on the drawing as a coil 9 mounted in a setting 10. If desired, the coil may be sufficiently large to provide time for the complete reaction, but, if a longer time of reaction is desired, the material from the coil may be passed by means of a line 11 through a reaction chamber 12. In either case, whether the products pass through the reaction chamber and line 12a or through a by-pass line 13, they pass through line 13a and discharge into a fractionating tower 14 which is provided with fractionating plates 15 and a reflux coil 16. Gasoline vapors are withdrawn by vapor pipe 17 and condensed at 18 and collected at 19. If desired, an intermediate cut may be withdrawn from the middle of the tower by a line 20, cooled in the cooler 21, and may be returned for reuse by line 22 and pump 23. This material, or a portion of it, may be returned to the vessel 6 through line 6a and thus may serve as a dispersing agent in which the catalyst may be introduced.

The heavier products from the tower 14 are withdrawn from a pipe 24 and after suitable cooling at 25 are passed through a filter 26 or other suitable mechanical device for removing the catalyst from the oil. Such oil is preferably sent to storage by pipe 27 but if desired a portion of it may be passed by pipe 28 and pump 29 for reuse in the process, either to vessel 6 through line 6a or to coil 3 through line 2a.

In the above description, two separate coils, one for the vaporization and one for cracking are shown, but if desired both may be mounted the same as in previous setting without departing from the point in question.

In accordance with the present invention, there is introduced into the stream of oil vapors passing through the cracking zone a catalyst slurry formed of a hydrous oxide of silica combined with one or more metallic oxides, such as alumina, zirconia, magnesia, boria, and the like, as previously described. The amount of such hydrous oxide catalyst introduced into the oil may be in an amount of from 0.1 to 10 pounds of catalyst per barrel of oil calculated on the dry basis. In addition to the hydrous oxide catalyst herein described naturally active or activated clays may also be injected through line 30 into the oil stream passing through the cracking zone.

Upon injecting the catalyst slurry into the oil stream, the free water present therein is immediately vaporized by the superheating of the oil vapors, and the catalyst particles are intimately dispersed throughout the oil stream.

It is preferred to introduce the catalyst into the oil stream at a point where the slurry is completely vaporized without the condensation of any oil vapors. This can be achieved by adding the catalyst slurry at a point in the heating zone at which the input of heat is very high, and the tendency to condense may be offset to a considerable degree by preheating the slurry to as high a temperature as possible without decomposition.

The oil vapor stream may be superheated sufficiently to provide heat for immediately vaporizing the water present in the catalyst when the latter is dispersed in the vapor stream.

While it is preferred to introduce the catalyst into the vapors as just described, it is possible to obtain improved results in some cases by introducing the catalyst into the feed prior to or during vaporization.

The oils employed for the present process should be distillates capable of complete vaporization under the conditions prevailing and the conditions of temperature and pressure should be adjusted so as to obtain complete vaporization. The oil is preferably preheated to 800° or 850° F. or higher before introduction of the catalyst and the pressure imposed at coil outlet should be at least 200 pounds per square inch, although it is preferable to use considerably higher pressures, say 250 to 1000 or 2000 pounds. If the oil cannot be vaporized under these conditions, then it should be redistilled so as to produce a lower boiling cut which can be so employed. It is found, however, that the introduction of a considerable amount of lighter oil, such as naphtha or hydrocarbon gases, assists the vaporization of heavier stocks, especially when vaporization is carried out in a coil such as provided here, in which the tube size is such as to prevent stratification of the vapor from the liquid phases. In this way it is often possible to avoid redistillation and to accomplish cracking of stocks in vapor phase which could not be employed if used in absence of the lighter stock. The lighter oil is also improved somewhat as to volatility and anti-detonation quality. Heavy oils may be distilled or cracked previously by conventional methods in order to obtain a lower boiling stock which can be vaporized under the temperatures and pressures disclosed, but even naphtha stocks may be used if sufficient light oil is added to insure complete separation of oily constituents.

A coil is preferably provided to serve as the cracking zone so that heat may be added during cracking, that is to say, while the catalyst and the oil vapors are in contact, and the time is provided so that a substantial yield of gasoline is obtained. It is preferable to provide a coil and upflow drum for reaction space and it is found that catalyst stratificatiton occurs in the drum and effects additional decomposition, so that a greater degree of cracking may be afforded than is possible in the limited coil space available. However, the pressure of an upflow reaction chamber is not essential to attain all the objects of the invention and, if desired, all the cracking may be carried out in a coil. Temperature during the cracking reaction is, as stated above, above about 900° F. and adjusted so as to prevent condensation of the heavier fractions of the feed stock or reaction products. While temperatures in excess of 1000° F. may be used, it has been found that with an effective catalyst temperature generally need not be above 1000° F. with pressure of 200 to 500 pounds and preferably higher with higher temperatures. These conditions in combination with the use of a siliceous catalyst of the class disclosed above introduced where the oil is in the vapor phase are the essential elements.

The oil discharged from the cracking zone may be cooled and clay separated, but it is preferred to separate a light distillate suitable for gasoline and a heavier oil which carries the catalytic material. The catalyst may be separated from this oil by mechanical means such as filtration or centrifugation from liquid oil or by vapor by means of cyclone separator but some of the clay appears to accumulate in the reaction drum, if it is employed, and this effects an increase in octane number of the gasoline produced. In the process it is possible to obtain very high yields of gasoline from gas oils with low gas yields and it is not ordinarily necessary to use recirculation methods as are commonly employed in cracking processes.

Having described the preferred embodiment of the invention, it will be understood that it embraces such other variations and modifications as come within the scope thereof.

What is desired to be protected by Letters Patent is:

1. A method of producing gasoline by cracking hydrocarbon oil which comprises admixing the oil to be cracked with an undried hydrous silica prepared from a metal silicate solution and containing imbibed water and having mixed therewith an active oxide cracking catalyst, passing the mixture of hydrocarbon oil and hydrous silica oxide mixture through a cracking zone, maintaining said cracking zone at a temperature of from 1000° to 1200° F. and under a pressure of at least 200 lbs./sq. in., controlling the temperature and pressure relationship within said zone to keep said oil in vapor phase therein, withdrawing cracked products from said cracking zone and fractionating said cracked products to segregate a gasoline fraction therefrom.

2. A method of producing gasoline by cracking hydrocarbon oils which comprises vaporizing the oils to be cracked, superheating the oil vapors to a temperature materially above the condensation point thereof, introducing into said superheated oil vapors an undried hydrous silica prepared from a metal silicate solution and containing imbibed water and having mixed therewith an active oxide cracking catalyst in a substantial amount whereby said silica-oxide mixture is rapidly dried by the superheated vapor without reducing the vapors below the condensation point thereof and solid catalyst particles in finely-divided form are dispersed in the vaporized oil, and passing the resulting mixture through a cracking zone maintained at cracking temperature and under a pressure of at least 200 lbs./sq. in.

3. The method defined in claim 2 wherein the undried hydrous silica oxide mixture consists of a synthetically prepared plural hydrogel of silica and alumina.

4. The method defined in claim 2 wherein the amount of catalyst introduced into said oil vapors is between about 0.1 and 10 pounds of catalyst per barrel of oil, said catalyst being calculated on a dry basis.

5. In a process for preparing motor fuel by passing a hydrocarbon oil feed stock in the vapor phase through a cracking zone under a pressure of at least 200 lbs./sq. in. and temperatures between about 1000° F. and 1200° F. and adding thereto a solid siliceous catalyst and maintaining the vaporous stock and siliceous catalyst in the cracking zone for sufficient time to effect substantial conversion of the oil to gasoline, the improvement which comprises adding to the siliceous catalyst-containing oil stream passing to said cracking zone a hydrous oxide jelly comprising an active cracking catalyst, withdrawing the cracked products from the cracking zone and fractionating said cracked products to segregate a motor fuel fraction therefrom.

6. A method of producing gasoline by cracking hydrocarbon oil which comprises admixing the hydrocarbon oil to be cracked with an undried hydrous silica prepared from a metal silicate solution and having admixed therewith a metal oxide active as a cracking catalyst and selected from the group consisting of an oxide in hydrosol form, an oxide in hydrogel form, an oxide in gelatinous precipitate form, a dry oxide gel and a dry oxide, passing the mixture of oil and hydrous silica-metal oxide mixture through a cracking zone at an elevated temperature and pressure and maintaining the oil in vapor phase, withdrawing cracked products from said cracking zone and separating gasoline from the cracked products.

7. A method according to claim 6 wherein the undried hydrous silica-oxide mixture consists of silica hydrosol and alumina hydrosol.

8. A method according to claim 6 wherein the undried hydrous silica-oxide mixture consists of silica hydrogel and alumina hydrogel.

REGINALD K. STRATFORD.